United States Patent
Zhang et al.

(10) Patent No.: US 10,581,314 B2
(45) Date of Patent: Mar. 3, 2020

(54) OVERCURRENT PROTECTION CIRCUIT AND LIQUID CRYSTAL DISPLAY

(71) Applicant: Shenzhen China Star Optoelectronics Semiconductor Display Technology Co., Ltd., Shenzhen, Guangdong (CN)

(72) Inventors: Xianming Zhang, Shenzhen (CN); Dan Cao, Shenzhen (CN)

(73) Assignee: Shenzhen China Star Optoelectronics Semiconductor Display Technology Co., Ltd., Shenzhen, Guangdong (CN)

(*) Notice: Subject to any disclaimer, the term of this patent is extended or adjusted under 35 U.S.C. 154(b) by 234 days.

(21) Appl. No.: 15/575,505

(22) PCT Filed: Sep. 4, 2017

(86) PCT No.: PCT/CN2017/100359
§ 371 (c)(1),
(2) Date: Nov. 20, 2017

(87) PCT Pub. No.: WO2019/015034
PCT Pub. Date: Jan. 24, 2019

(65) Prior Publication Data
US 2019/0115825 A1    Apr. 18, 2019

(51) Int. Cl.
*H02M 3/07*   (2006.01)
*H02M 1/32*   (2007.01)
*G09G 3/36*   (2006.01)
*H02H 9/02*   (2006.01)
*H02H 3/08*   (2006.01)
*H02H 5/04*   (2006.01)

(52) U.S. Cl.
CPC ............ *H02M 1/32* (2013.01); *G09G 3/36* (2013.01); *H02M 3/07* (2013.01); *H02M 3/073* (2013.01); *G09G 2330/026* (2013.01); *G09G 2330/04* (2013.01); *H02H 3/08* (2013.01); *H02H 5/041* (2013.01); *H02H 9/02* (2013.01); *H02H 9/025* (2013.01)

(58) Field of Classification Search
USPC ...................................... 361/86–87, 93.7–93.9
See application file for complete search history.

(56) References Cited

U.S. PATENT DOCUMENTS

2016/0294178 A1* 10/2016 Ohki ..................... H02H 3/08
2018/0048140 A1*  2/2018 Takuma ................. B60R 16/02

* cited by examiner

*Primary Examiner* — Danny Nguyen
(74) *Attorney, Agent, or Firm* — Mark M. Friedman

(57) ABSTRACT

An overcurrent protection circuit and a liquid crystal display are provided. The overcurrent protection circuit includes a first field effect transistor, a capacitor, a voltage comparator, and a logic control module, wherein a gate of the first field effect transistor is coupled to a supply voltage, a source of the first field effect transistor is coupled to a direct voltage, a positive input terminal of the voltage comparator is electrically connected to a drain of the first field effect transistor, a negative input terminal of the voltage comparator is coupled to a reference voltage, an output terminal of the voltage comparator, and an output terminal of the voltage comparator is connected to an input terminal of a logic control module.

20 Claims, 2 Drawing Sheets

OVERCURRENT PROTECTION CIRCUIT AND LIQUID CRYSTAL DISPLAY

FIELD OF THE INVENTION

The present disclosure relates to a technical field of displays, and particularly to an overcurrent protection circuit and a liquid crystal display.

BACKGROUND OF THE INVENTION

In driving a panel, a driving voltage, having a high level for a gate, is generated by a charge pump, which is the most commonly used topology due to low costs and simple implementation compared to a normal boost circuit.

FIG. 1 illustrates a common charge pump circuit 10, wherein diodes D1 to D4 constitute a two-stage charge pump, which is operated using a current pump function of capacitors C1 and C2 through a voltage variation of a DRP pin, to generate a final requested voltage. However, this method has a problem in that it will cause parasitic inductances L1 to L3 to be generated due to outer wiring. Since a simulated supply voltage AVDD has been established during a power-on phase, a large current will pass through the parasitic inductances L2 and L1 when a transistor Q2 turns on and off, resulting in damage to the DRP pin and other logic devices adjusted by pulse widths in a chip.

When the charge pump starts to operate, Q2 turns on. There are two loops 101 and 102. If C1 and C2 are both not being charged, then two loops will be passed through a large current. When Q2 turns off, a large amount of energy will be stored in L1 and L2, resulting in a sudden increase in voltage in the DRP. Then, the parasitic inductances are larger, and the energy is also larger. In addition, parasitic parameters also increase due to the presence of the parasitic inductances.

Therefore, it is necessary to provide an overcurrent protection circuit and a liquid crystal display to solve problems existing in the prior art.

SUMMARY OF THE INVENTION

An object of the present disclosure is to provide an overcurrent protection circuit and a liquid crystal display, which are able to protect a charge pump circuit from overcurrent.

In order to solve above problem, an overcurrent protection circuit is provided in the present disclosure, which is configured to protect a charge pump circuit from overcurrent, and comprises a first field effect transistor, a capacitor, a voltage comparator, and a logic control module;
wherein the first field effect transistor comprises a gate coupled to a supply voltage, a source coupled to a direct voltage, and a drain electrically connected to one terminal of the capacitor, with the other terminal of the capacitor grounded;
wherein the voltage comparator comprises a positive input terminal electrically connected to the drain of the first field effect transistor, a negative input terminal coupled to a reference voltage, and an output terminal connected to an input terminal of the logic control module; and an output terminal of the logic control module is connected to the charge pump circuit;
wherein the charge pump circuit comprises a second field effect transistor and a voltage input terminal, and the second field effect transistor comprises a gate connected to the output terminal of the logic control module, a source connected to the voltage input terminal, and a grounded drain; and
wherein the overcurrent protection circuit further comprises a resistor coupled between the output terminal of the logic control module and ground.

The overcurrent protection circuit of the present disclosure is configured to raise an impedance of the second field effect transistor to protect the charge pump circuit from overcurrent during a turn-on phase of the charge pump circuit.

In the overcurrent protection circuit of the present disclosure, the voltage comparator comprises a high level input terminal configured to input a first voltage, and a low level input terminal configured to input a second voltage, wherein both the first voltage and the second voltage depend on the impedance of the second field effect transistor.

In the overcurrent protection circuit of the present disclosure, the first field effect transistor is an N-channel field effect transistor; wherein the voltage comparator outputs the first voltage in response to a low level of the supply voltage during a turn-on phase of the charge pump circuit, while the voltage comparator outputs the second voltage in response to a high level of the supply voltage during an operational phase of the charge pump circuit.

In the overcurrent protection circuit of the present disclosure, the second voltage indicates a voltage corresponding to a high impedance of the second field effect transistor, while the first voltage indicates a voltage corresponding to an impedance of the second field effect transistor within a predetermined impedance range.

The overcurrent protection circuit of the present disclosure further comprises a switch comprising an input terminal connected to the output terminal of the voltage comparator, an output terminal connected to the input terminal of the logic control module, and a control terminal coupled to the supply voltage.

In the overcurrent protection circuit of the present disclosure, the switch turns on when the supply voltage is at a high level, and the switch turns off when the supply voltage is at a low level.

In order to resolve the above problem, another overcurrent protection circuit is provided in the present disclosure, which is configured to protect a charge pump circuit from overcurrent, comprising: a first field effect transistor, a capacitor, a voltage comparator, and a logic control module;
wherein the first field effect transistor comprises a gate coupled to a supply voltage, a source coupled to a direct voltage, and a drain electrically connected to one terminal of the capacitor, with the other terminal of the capacitor grounded; and
wherein the voltage comparator comprises a positive input terminal electrically connected to the drain of the first field effect transistor, a negative input terminal coupled to a reference voltage, and an output terminal connected to an input terminal of the logic control module; and an output terminal of the logic control module is connected to the charge pump circuit.

In the overcurrent protection circuit of the present disclosure, the charge pump circuit comprises a second field effect transistor and a voltage input terminal, and the second field effect transistor comprises a gate connected to the output terminal of the logic control module, a source connected to the voltage input terminal, and a grounded drain.

The overcurrent protection circuit of the present disclosure is configured to raise an impedance of the second field effect transistor to protect the charge pump circuit from overcurrent during a turn-on phase of the charge pump circuit.

In the overcurrent protection circuit of the present disclosure, the voltage comparator comprises a high level input terminal configured to input a first voltage, and a low level input terminal configured to input a second voltage, wherein both of the first voltage and the second voltage depend on the impedance of the second field effect transistor.

In the overcurrent protection circuit of the present disclosure, the first field effect transistor is an N-channel field effect transistor; wherein the voltage comparator outputs the first voltage in response to a low level of the supply voltage during a turn-on phase of the charge pump circuit, while the voltage comparator outputs the second voltage in response to a high level of the supply voltage during an operational phase of the charge pump circuit.

In the overcurrent protection circuit of the present disclosure, the second voltage indicates a voltage corresponding to a high impedance of the second field effect transistor, while the first voltage indicates a voltage corresponding to an impedance of the second field effect transistor within a predetermined impedance range.

The overcurrent protection circuit of the present disclosure further comprises a resistor coupled between the output terminal of the logic control module and ground.

The overcurrent protection circuit of the present disclosure further comprises a switch, the switch comprising an input terminal connected to the output terminal of the voltage comparator, an output terminal connected to the input terminal of the logic control module, and a control terminal coupled to the supply voltage.

In the overcurrent protection circuit of the present disclosure, the switch turns on when the supply voltage is at a high level, and the switch turns off when the supply voltage is at a low level.

A liquid crystal display is also provided in the present disclosure, and includes an overcurrent protection circuit as mentioned above.

The overcurrent protection circuit and the liquid crystal display in the present disclosure are able to keep a high impedance in the field effect transistor of the charge pump circuit during the power-on phase by adding the overcurrent protection circuit on the known charge pump circuit, so as to suppress generating high current and prevent a chip breakdown, while a normal operation of the chip is ensured.

DETAILED DESCRIPTION OF THE PREFERRED EMBODIMENTS

Figure 1:
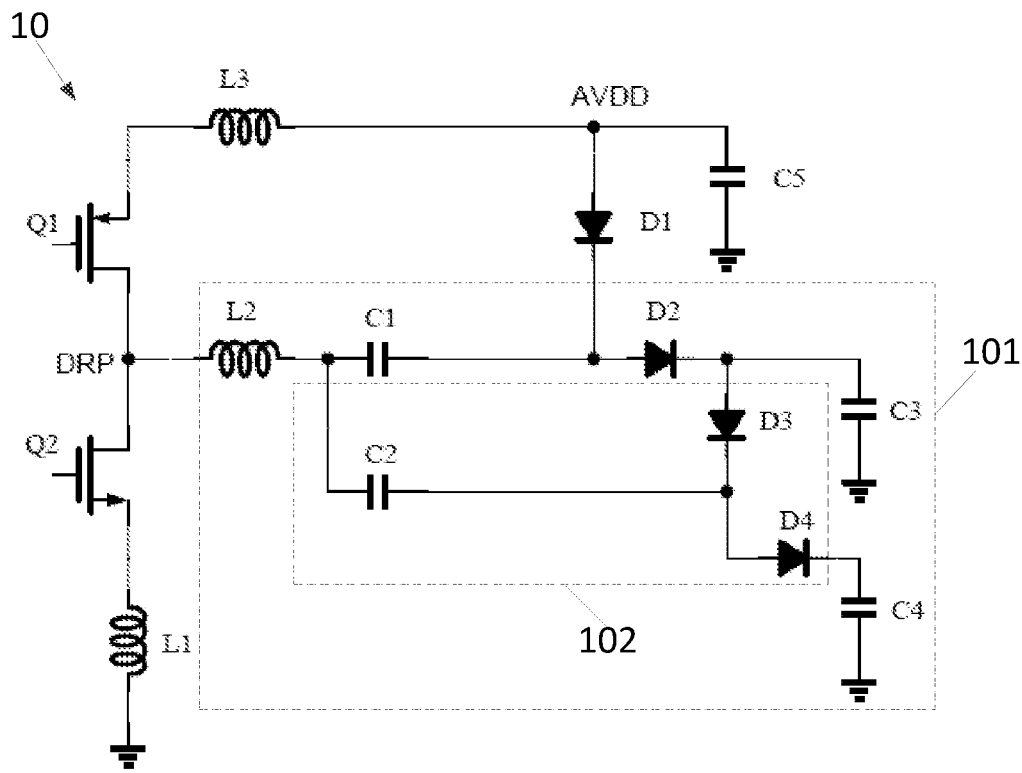
FIG. 1 is a charge pump circuit in the prior art.

The following description of each embodiment refers to the appended drawings for illustrating specific embodiments in which the present disclosure may be practiced. Directional terms as mentioned in the present disclosure, such as "up", "down", "front", "post", "left", "right", "inside", "outside", "lateral", etc., are merely used for the purpose of illustrating and understanding the present disclosure and are not intended to be limiting of the present disclosure. In the drawings, units with similar structures are denoted by the same reference numerals.

Figure 2:
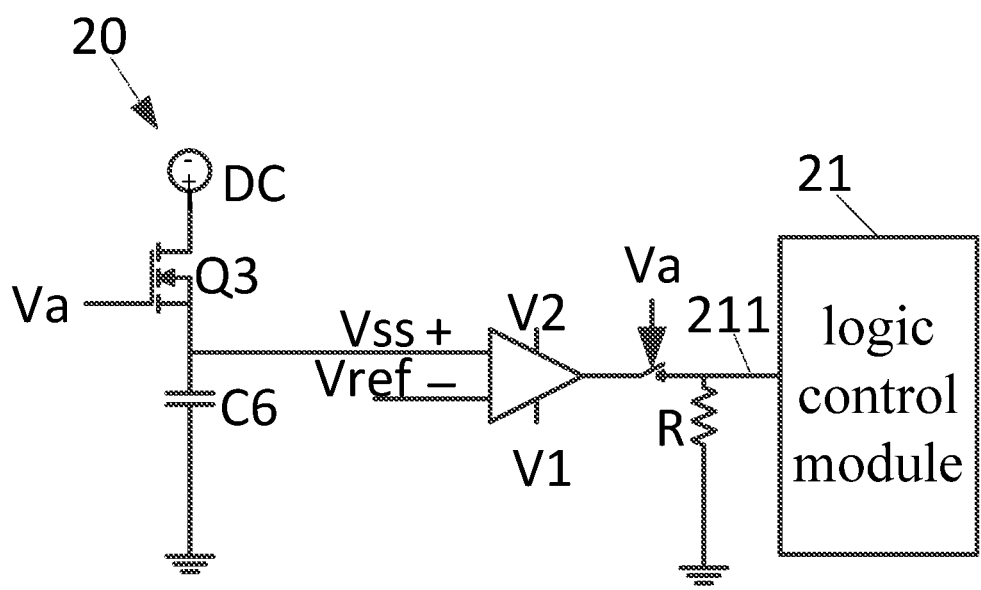
FIG. 2 is a circuit diagram of an overcurrent protection circuit according to the present disclosure.

Refer to FIG. 2, which is a circuit diagram of an overcurrent protection circuit according to the present disclosure. As shown in FIG. 2, an overcurrent protection circuit 20 of the present disclosure is configured to protect a charge pump circuit 10 from overcurrent. The charge pump circuit 10 is disposed in a pulse width modulation (PWM) chip. The overcurrent protection circuit 20 includes a first field effect transistor Q3, a capacitor Q6, a voltage comparator, and a logic control module 21.

A gate of the first field effect transistor Q3 is coupled to a supply voltage Va, a source of the first field effect transistor Q3 is coupled to a direct voltage DC, and a drain of the first field effect transistor Q3 is electrically connected to one terminal of the capacitor C6, the other terminal of the capacitor C6 is grounded.

A positive input terminal of the voltage comparator is electrically connected to the drain of the first field effect transistor Q3, a negative input terminal of the voltage comparator is coupled to a reference voltage Vref, and an output terminal of the voltage comparator is connected to an input terminal 211 of the logic control module 21; and an output terminal 212 of the logic control module 21 is connected to the charge pump circuit 10.

Figure 3:
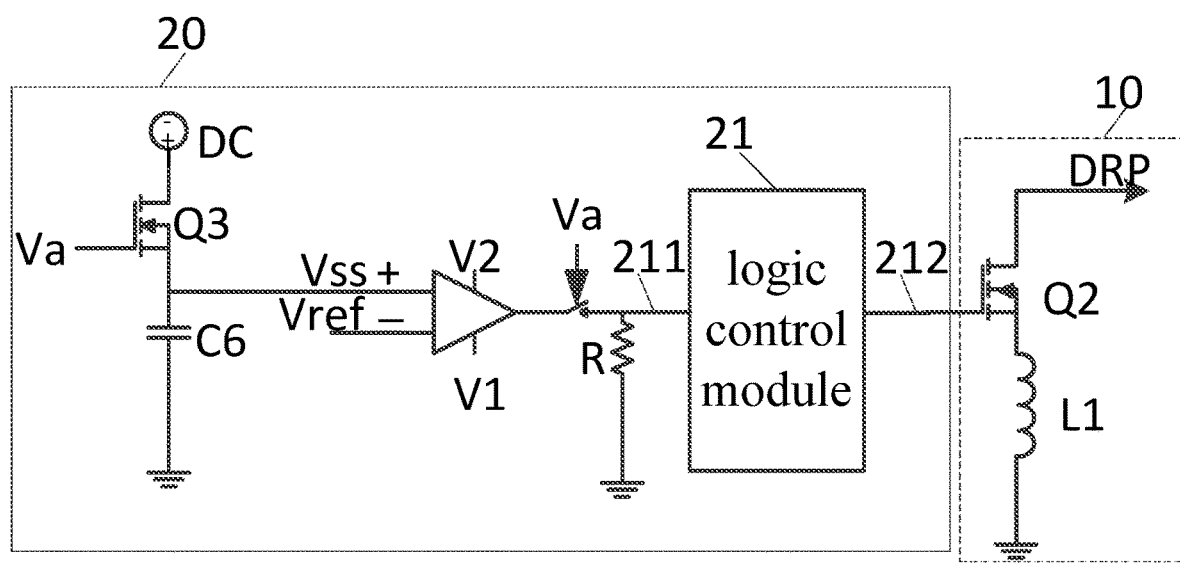
FIG. 3 is a circuit diagram of a combination circuit of the overcurrent protection circuit and the charge pump circuit according to the present disclosure.

In conjunction with FIG. 3, the charge pump circuit 10 includes a second field effect transistor Q2 and a voltage input terminal DRP, the output terminal 212 of the logic control module 21 is connected to a gate of the second field effect transistor Q2, a source of the second field effect transistor Q2 is connected to the voltage input terminal DRP, a drain of the second field effect transistor Q2 is grounded. In one embodiment, the drain of the second field effect transistor Q2 is grounded through a first inductance L1. The logic control module 21 is a logic control module used by the known pulse width modulation chip. The logic control module 21 is configured to control for turning on and off of Q2.

The charge pump circuit 10 further comprises a resistor R and a switch, a terminal of the resistor R is connected to the input terminal 211 of the logic control module 21, the other terminal of the resistor R is grounded.

The output terminal of the voltage comparator is connected to an input terminal of the switch, an output terminal of the switch is connected to the input terminal 211 of the logic control module 21, a control terminal of the switch is coupled to the supply voltage Va, wherein the switch turns off when the supply voltage Va is at a low level.

A first voltage V2 is inputted to a high level input terminal of the voltage comparator, and a second voltage V1 is inputted to a low level input terminal of the voltage comparator, both of the first voltage V2 and the second voltage V1 depend on the impedance of the second field effect transistor Q2.

The second voltage V1 indicates a voltage corresponding to a high impedance of the second field effect transistor Q2, while the first voltage V2 indicates a voltage corresponding to an impedance of the second field effect transistor Q2 within a predetermined impedance range. Namely, the first voltage V2 indicates a voltage of the logic control module 21 corresponding to the pulse width modulation chip operated in a normal state. In one embodiment, the first field effect transistor Q3 and the second field effect transistor Q2 both are N-channel field effect transistors.

During a specific operation period, a driving voltage VGH of the gate having a high level is controlled using the supply voltage Va after a machine is powered-on. Before a simulated supply voltage AVDD has been established, the Va is at a low level, at the same time, the first field effect transistor Q3 turns off, the switch is opened, the control terminal of the second field effect transistor Q2 is at a low level, so as to turn off Q2, wherein the simulated supply voltage AVDD is generated from a boost module of the pulse width modulation chip, that is a supply voltage of a driving panel. The Va is a signal generated in the pulse width modulation chip after a value of the AVDD voltage reaches a predetermined value.

After the simulated supply voltage AVDD has been established, Va is at a high level while the first field effect transistor Q3 turns on for charging the capacitor C6, such that a voltage VSS at the positive input terminal of the voltage comparator raises and the switch is closed, then begin to supply electric energy to Q2.

During a beginning phase, that is a turn-on phase of the charge pump circuit, since the voltage VSS at the positive input terminal of the voltage comparator is less than the reference voltage Vref, the voltage comparator outputs the second voltage V1, so as to supply electric energy to the logic control module 21. At the same time, the gate of Q2 is controlled by the logic control module. However, compared with the original condition, when Q2 turns on, an impedance is very high and an impulse current generated will be very low, such that a higher energy will not be generated at L1 and L2, thereby ensuring that the pulse width modulation chip will not be impacted form parasitic parameters and high current at the moment of power-on. Namely, during the turn-on phase of the charge pump circuit 10, the overcurrent protection circuit 20 is configured to raise the impedance of the second field effect transistor Q2, so as to protect a charge pump circuit 10 from overcurrent.

In other words, through a resistance of the second field effect transistor Q2 located at the voltage input terminal DRP is processed at the moment of the power-on, so as to ensure that energy storing in the field effect transistor is less than a withstand voltage of the voltage input terminal. Thus, it can avoid the pulse width modulation chip being damaged at the moment of power-on.

During a continuous charging period, that is an operational phase of the charge pump circuit, the Vss is larger than the Vref, therefore the output of the voltage comparator is the first voltage V2. At the same time, the voltage supplied to the logic control module 21 is a voltage for a normal operation, thereby ensuring that the impedance is at a normal level when Q2 operates in a normal condition, and does not cause a heating process in the pulse width modulation chip.

By the overcurrent protection circuit, during a process of the power-on of the pulse width modulation chip, after the AVDD voltage reaches the predetermined value, the VGH voltage begins to output, at the same time, the impedance remaining in Q2 is higher through charging to C6, so as to suppress the generation of large current, and to avoid a damage of the pulse width modulation chip and charge to the VSS.

A liquid crystal display is also provided in the present disclosure, and includes the above-mentioned overcurrent protection circuit, the specific structure of the overcurrent protection circuit is referred to above, it will not be repeated here.

The overcurrent protection circuit and the liquid crystal display in the present disclosure are able to keep a high impedance in the field effect transistor of the charge pump circuit during the power-on phase by adding the overcurrent protection circuit on the known charge pump circuit, so as to suppress generating high current and prevent a chip breakdown, while normal operation of the chip is ensured.

While the present disclosure has been disclosed with reference to preferred embodiments, the above-described embodiments are not intended to limit the present disclosure, and a person having ordinary skill in the art will be able to make various changes and modifications without departing from the spirit and scope of the present disclosure, and thus the scope of the present disclosure is defined by the scope of the claims.

What is claimed is:

1. An overcurrent protection circuit configured to protect a charge pump circuit from overcurrent, comprising: a first field effect transistor, a capacitor, a voltage comparator, and a logic control module;
    wherein the first field effect transistor comprises a gate coupled to a supply voltage, a source coupled to a direct voltage, and a drain electrically connected to one terminal of the capacitor, with the other terminal of the capacitor grounded;
    wherein the voltage comparator comprises a positive input terminal electrically connected to the drain of the first field effect transistor, a negative input terminal coupled to a reference voltage, and an output terminal connected to an input terminal of the logic control module; and an output terminal of the logic control module is connected to the charge pump circuit;
    wherein the charge pump circuit comprises a second field effect transistor and a voltage input terminal, and the second field effect transistor comprises a gate connected to the output terminal of the logic control module, a source connected to the voltage input terminal, and a grounded drain; and
wherein the overcurrent protection circuit further comprises a resistor coupled between the output terminal of the logic control module and ground.

2. The overcurrent protection circuit as claimed in claim 1, being configured to raise an impedance of the second field effect transistor to protect the charge pump circuit from overcurrent during a turn-on phase of the charge pump circuit.

3. The overcurrent protection circuit as claimed in claim 1, wherein the voltage comparator comprises a high level input terminal configured to input a first voltage, and a low level input terminal configured to input a second voltage, wherein both of the first voltage and the second voltage depend on an impedance of the second field effect transistor.

4. The overcurrent protection circuit as claimed in claim 3, wherein the first field effect transistor is an N-channel field effect transistor; wherein the voltage comparator outputs the first voltage in response to a low level of the supply voltage during a turn-on phase of the charge pump circuit, while the voltage comparator outputs the second voltage in response to a high level of the supply voltage during an operational phase of the charge pump circuit.

5. The overcurrent protection circuit as claimed in claim 3, wherein the second voltage indicates a voltage corresponding to a high impedance of the second field effect transistor, while the first voltage indicates a voltage corresponding to an impedance of the second field effect transistor within a predetermined impedance range.

6. The overcurrent protection circuit as claimed in claim 1, further comprising:
    a switch comprising an input terminal connected to the output terminal of the voltage comparator, an output terminal connected to the input terminal of the logic control module, and a control terminal coupled to the supply voltage.

7. The overcurrent protection circuit as claimed in claim 6, wherein the switch turns on when the supply voltage is at a high level, and the switch turns off when the supply voltage is at a low level.

8. An overcurrent protection circuit configured to protect a charge pump circuit from overcurrent, comprising: a first field effect transistor, a capacitor, a voltage comparator, and a logic control module;
   wherein the first field effect transistor comprises a gate coupled to a supply voltage, a source coupled to a direct voltage, and a drain electrically connected to one terminal of the capacitor, with the other terminal of the capacitor grounded; and
   wherein the voltage comparator comprises a positive input terminal electrically connected to the drain of the first field effect transistor, a negative input terminal coupled to a reference voltage, and an output terminal connected to an input terminal of the logic control module; and an output terminal of the logic control module is connected to the charge pump circuit.

9. The overcurrent protection circuit as claimed in claim 8, wherein the charge pump circuit comprises a second field effect transistor and a voltage input terminal, and the second field effect transistor comprises a gate connected to the output terminal of the logic control module, a source connected to the voltage input terminal, and a grounded drain.

10. The overcurrent protection circuit as claimed in claim 9, being configured to raise an impedance of the second field effect transistor to protect the charge pump circuit from overcurrent during a turn-on phase of the charge pump circuit.

11. The overcurrent protection circuit as claimed in claim 9, wherein the voltage comparator comprises a high level input terminal configured to input a first voltage, and a low level input terminal configured to input a second voltage, wherein both of the first voltage and the second voltage depend on an impedance of the second field effect transistor.

12. The overcurrent protection circuit as claimed in claim 11, wherein the first field effect transistor is an N-channel field effect transistor; wherein the voltage comparator outputs the first voltage in response to a low level of the supply voltage during a turn-on phase of the charge pump circuit, while the voltage comparator outputs the second voltage in response to a high level of the supply voltage during an operational phase of the charge pump circuit.

13. The overcurrent protection circuit as claimed in claim 11, wherein the second voltage indicates a voltage corresponding to a high impedance of the second field effect transistor, while the first voltage indicates a voltage corresponding to an impedance of the second field effect transistor within a predetermined impedance range.

14. The overcurrent protection circuit as claimed in claim 8, further comprising a resistor coupled between the output terminal of the logic control module and ground.

15. The overcurrent protection circuit as claimed in claim 8, further comprising a switch, the switch comprising an input terminal connected to the output terminal of the voltage comparator, an output terminal connected to the input terminal of the logic control module, and a control terminal coupled to the supply voltage.

16. The overcurrent protection circuit as claimed in claim 15, wherein the switch turns on when the supply voltage is at a high level, and the switch turns off when the supply voltage is at a low level.

17. A liquid crystal display, comprising:
   an overcurrent protection circuit configured to protect a charge pump circuit from overcurrent, and comprising: a first field effect transistor, a capacitor, a voltage comparator, and a logic control module;
   wherein the first field effect transistor comprises a gate coupled to a supply voltage, a source coupled to a direct voltage, and a drain electrically connected to one terminal of the capacitor, with the other terminal of the capacitor grounded; and
   wherein the voltage comparator comprises a positive input terminal electrically connected to the drain of the first field effect transistor, a negative input terminal coupled to a reference voltage, and an output terminal connected to an input terminal of the logic control module; and an output terminal of the logic control module is connected to the charge pump circuit.

18. The liquid crystal display as claimed in claim 17, wherein the charge pump circuit comprises a second field effect transistor and a voltage input terminal, and the second field effect transistor comprises a gate connected to the output terminal of the logic control module, a source connected to the voltage input terminal, and a drain grounded.

19. The liquid crystal display as claimed in claim 18, being configured to raise an impedance of the second field effect transistor to protect the charge pump circuit from overcurrent during a turn-on phase of the charge pump circuit.

20. The liquid crystal display as claimed in claim 18, wherein the voltage comparator comprises a high level input terminal configured to input a first voltage, and a low level input terminal configured to input a second voltage, wherein both of the first voltage and the second voltage depend on an impedance of the second field effect transistor.

* * * * *